United States Patent [19]
Veligdan

[11] Patent Number: 5,625,736
[45] Date of Patent: Apr. 29, 1997

[54] BLACK OPTIC DISPLAY

[75] Inventor: James T. Veligdan, Manorville, N.Y.

[73] Assignee: Associated Universities, Inc., Washington, D.C.

[21] Appl. No.: 584,046

[22] Filed: Jan. 11, 1996

[51] Int. Cl.$^6$ .................................................. G02B 6/04
[52] U.S. Cl. .............................. 385/120; 362/32; 385/901
[58] Field of Search .................................. 385/120, 115, 385/116, 121, 125, 129, 130–132, 901, 1, 4; 362/32; 358/901.1; 348/804; 40/547; 359/630, 633, 559, 9, 29

[56] References Cited

U.S. PATENT DOCUMENTS

| | | | |
|---|---|---|---|
| 3,884,546 | 5/1975 | Chu | 359/9 |
| 3,945,371 | 3/1976 | Adelman | 385/117 |
| 4,509,837 | 4/1985 | Kassies | 353/10 |
| 4,640,592 | 2/1987 | Nishimura et al. | 385/125 |
| 5,319,731 | 6/1994 | Eastman | 385/115 |
| 5,381,502 | 1/1995 | Veligdan | 385/115 |
| 5,440,428 | 8/1995 | Hegg et al. | 359/630 |
| 5,544,268 | 8/1996 | Bischel et al. | 385/4 |

*Primary Examiner*—Akm E. Ullah
*Attorney, Agent, or Firm*—Margaret C. Bogosian

[57] ABSTRACT

An optical display includes a plurality of stacked optical waveguides having first and second opposite ends collectively defining an image input face and an image screen, respectively, with the screen being oblique to the input face. Each of the waveguides includes a transparent core bound by a cladding layer having a lower index of refraction for effecting internal reflection of image light transmitted into the input face to project an image on the screen, with each of the cladding layers including a cladding cap integrally joined thereto at the waveguide second ends. Each of the cores is beveled at the waveguide second end so that the cladding cap is viewable through the transparent core. Each of the cladding caps is black for absorbing external ambient light incident upon the screen for improving contrast of the image projected internally on the screen.

13 Claims, 5 Drawing Sheets

BLACK OPTIC DISPLAY

BACKGROUND OF THE INVENTION

The present invention relates generally to fiber optics, and, more specifically, to an optic panel usable in a laser/optical projection video display.

The present invention is an improvement over U.S. Pat. No. 5,381,502, by J. T. Veligdan, and entitled "Flat or Curved Thin Optical Display Panel," assigned to the present assignee.

Video display screens are commonly used in television (TV) for example, and typically use cathode ray tubes (CRTs) for projecting the TV image. In the United States, the screen has a width to height ratio of 4:3 with 525 vertical lines of resolution. An electron beam is conventionally scanned both horizontally and vertically in the screen to form a number of picture elements, i.e. pixels, which collectively form the image. Color images are conventionally formed by selectively combining red, blue, and green pixels.

Conventional cathode ray tubes have a practical limit in size and are relatively deep to accommodate the required electron gun. Larger screen TVs are available which typically include various forms of image projection against a suitable screen for increasing the screen image size. However, such screens have various shortcomings including limited viewing angle, limited resolution, and limited brightness and typically are also relatively deep and heavy.

Various configurations are being developed for larger screen TVs which are relatively thin in depth. These include the use of conventional fiber optic cables in various configurations for channeling the light image from a suitable source to a relatively large screen face. However, typical fiber optic thin projection screens are relatively complex and vary in levels of resolution and brightness.

When viewing any type of video display screen, image contrast is an important parameter which affects viewing quality. To achieve high contrast in all ambient lighting conditions, it is necessary that the viewing screen be as dark as possible. This enables the actual black portions of the image to appear black. The manufacturers of conventional television cathode ray tubes have been trying to develop screens which appear darker or blacker for improving picture quality. However, it is impossible for direct view CRTs to actually be black because they utilize phosphors for forming the viewing image, with the phosphors themselves not being black.

Accordingly, an improved thin or flat panel optical screen for use in a projection TV, for example, is desired.

SUMMARY OF THE INVENTION

An optical display includes a plurality of stacked optical waveguides having first and second opposite ends collectively defining an image input face and an image screen, respectively, with the screen being oblique to the input face. Each of the waveguides includes a transparent core bound by a cladding layer having a lower index of refraction for effecting internal reflection of image light transmitted into the input face to project an image on the screen, with each of the cladding layers including a cladding cap integrally joined thereto at the waveguide second ends. Each of the cores is beveled at the waveguide second end so that the cladding cap is viewable through the transparent core. Each of the cladding caps is black for absorbing external ambient light incident upon the screen for improving contrast of the image projected internally on the screen.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
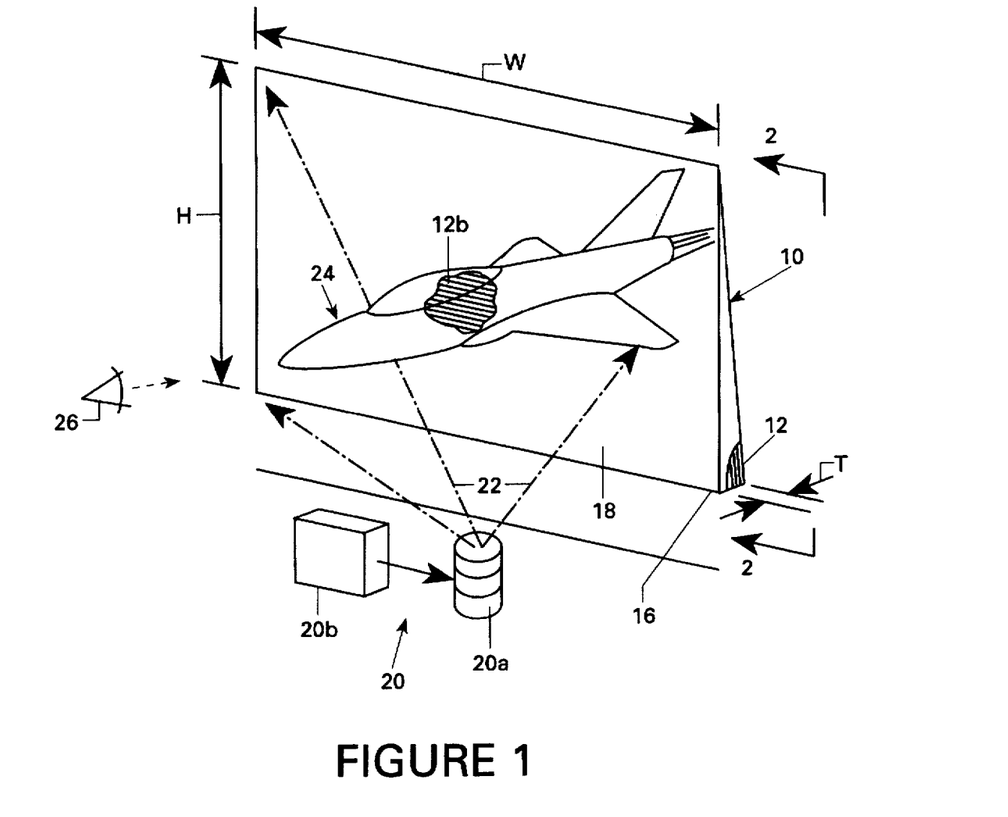
FIG. 1 is a schematic, perspective view of an exemplary optical panel in accordance with one embodiment of the present invention in the form of a large screen projection TV. The respective components of the invention are not drawn to scale herein.

Illustrated schematically in FIG. 1 is an optical panel or display 10 for guiding or channeling light therethrough which is in the exemplary form of a video display screen such as a projection screen TV. The panel 10 is illustrated in more particularity in FIG. 2 and includes a plurality of elongate light guiding optical waveguides 12 each having a longitudinal centerline axis 14 along which light is guided. The waveguides 12 are stacked laterally together and parallel to each other in abutting contact along their entire lengths, with each waveguide 12 having a first edge or end 12a which in this exemplary embodiment is an input end for receiving or passing light therethrough. Each waveguide 12 further includes a second edge or end 12b at an opposite end thereof relative to the centerline axis 14 which, in this exemplary embodiment, is an output end for emitting or passing the light carried through the waveguide 12.

Figure 2:
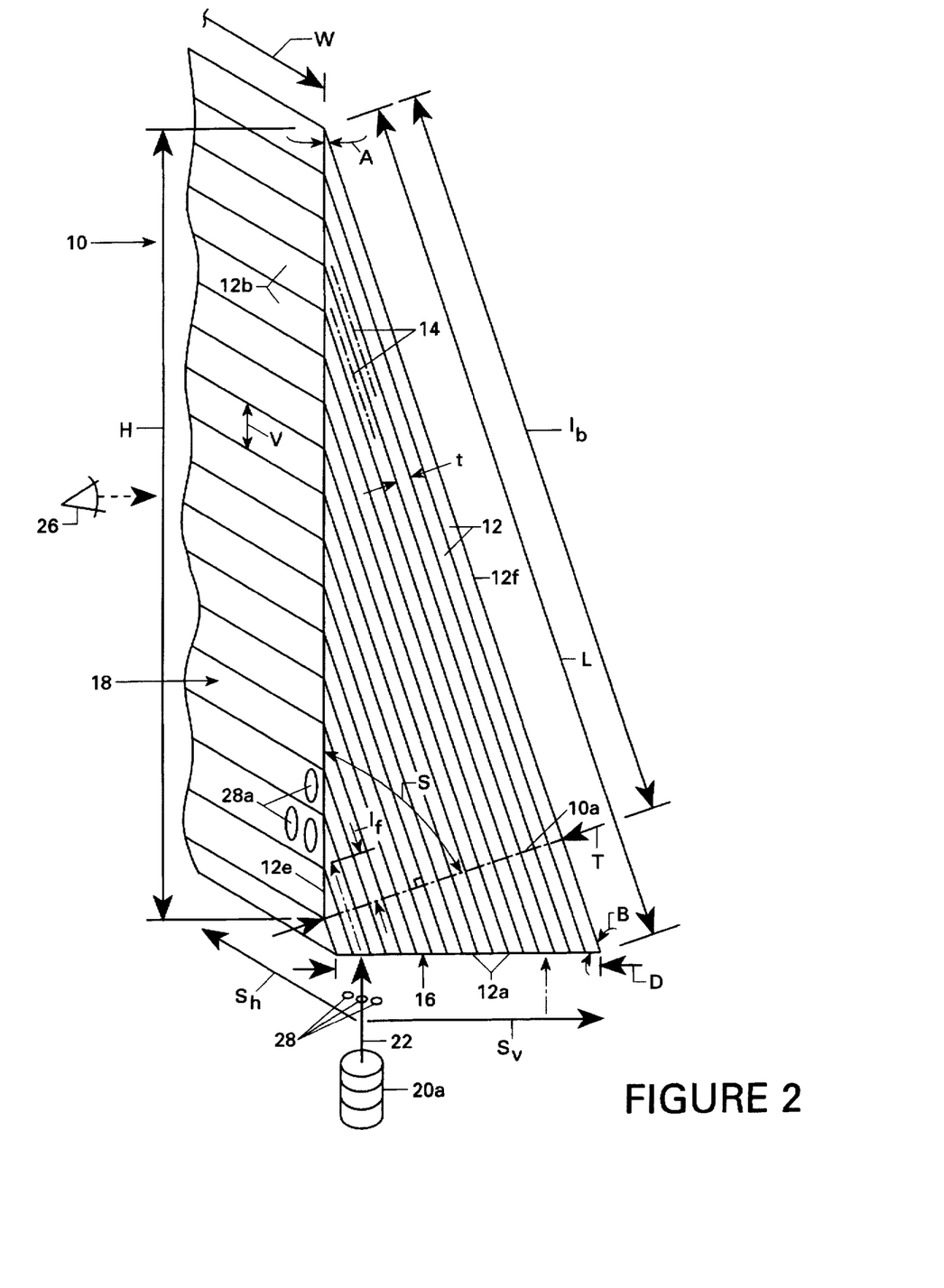
FIG. 2 is an enlarged, perspective, schematic elevational view of a portion of the optical panel illustrated in FIG. 1 and taken along line 2—2 therein and illustrates a plurality of exemplary planar optical waveguides therein.

The first ends 12a, therefore, preferably include means for coupling light to define input ends for receiving light and passing the light into the waveguide 12. For example, the input ends 12a may be simply conventionally optically polished to receive light in an optimum manner, as one type of suitable means for coupling light. The waveguide output, second ends 12b are effective for emitting or dispersing the light channeled through the waveguides 12 as further described hereinbelow.

In the exemplary embodiment illustrated in FIG. 2, the waveguides 12 are preferably in the form of generally flat sheets or ribbons each having a generally rectangular cross-section from the first end 12a to the second end 12b with a horizontal width W (see both FIGS. 1 and 2) being substantially greater than the thickness t of the waveguide 12. The waveguides 12 are stacked front-to-back in turn upon each other in abutting contact from the first to second ends 12a, 12b, with the second ends 12b extending continuously and horizontally along the width W without interruption from side-to-side.

As shown in FIG. 2, the first ends 12a of all the waveguides 12 are preferably disposed generally coplanar and collectively define a panel first or input face 16 for receiving light, which first face 16 has a length or depth D. The second ends 12b of all the waveguides 12 are also preferably disposed generally coplanar and collectively define a panel second or output face 18, having a length or height H, which forms the viewing screen in this exemplary embodiment.

Figure 3:
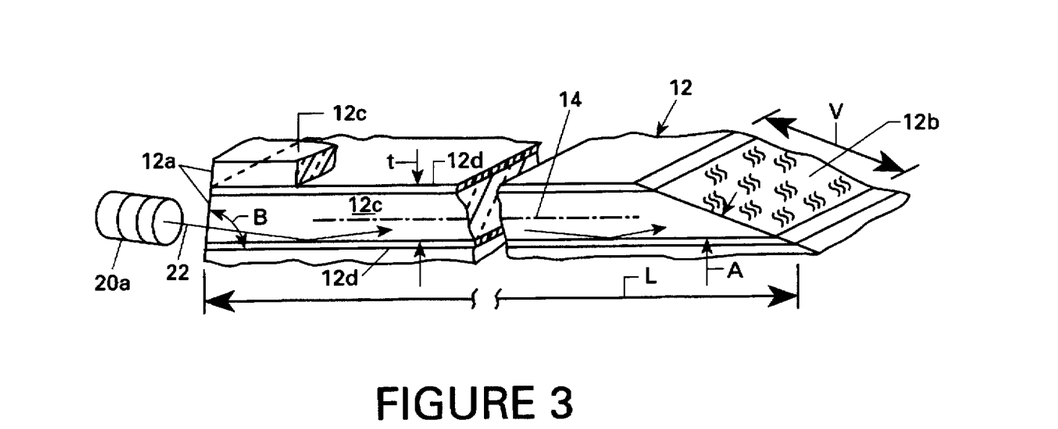
FIG. 3 is a partly sectional, enlarged view of an exemplary one of the waveguides illustrated in FIG. 2.

FIG. 3 illustrates in more particularity an exemplary one of the optical waveguides 12 shown in relation to portions of adjacent waveguides 12 in the panel 10. Each waveguide 12 includes an optically transparent core 12c having a suitable index of refraction or refractive index $n_1$ sandwiched between a pair of cladding sheets 12d having a lower refractive index $n_2$, i.e. $n_2$ being less than $n_1$. The light channeling property of the waveguide 12 is somewhat functionally equivalent to a conventional cylindrical fiber optic cable having a circular central core surrounded by an annular cladding with a lower refractive index so that light may be channeled therethrough and confined therein by total internal reflection. However, the ribbon waveguide 12 has significant additional advantages as described hereinbelow.

Referring again to FIG. 1, the panel 10 is disposed in combination with conventional means 20 for providing light in the form of a light beam 22 to the panel first face 16 for being observed from the panel second face 18 or viewing screen. The light providing means 20 may take any suitable and conventional form including for example a conventional scanning laser 20a, illustrated schematically in FIG. 1, which is effective for emitting light in the form of a laser beam 22 into the first face 16. Suitable conventional electronics including a conventional intensity modulator 20b suitably control the generation of the beam 22 which is conventionally scanned over the first face 16 by a suitable scanning mirror to produce a video image 24 on the panel second face 18 using horizontal and vertical scanning.

Since the panel 10 may have any suitable orientation in space, such as the vertical orientation shown in FIG. 1, the terms "vertical" and "horizontal" as used herein and in the claims broadly define two perpendicular directions in a relative sense for describing scanning both along the width W of the second face 18 (horizontal) and from waveguide-to-waveguide along the height H of the second face 18 (vertical). The panel 10 may alternatively be positioned horizontally in space for example, such as in a video game table, with vertical and horizontal scanning being relative to the observer looking downwardly at the screen panel 10.

The ribbon waveguide 12 allows the beam 22 to be scanned across the width W of the ribbon and propagated at any suitable angle therein within the plane of the ribbon. As shown in FIG. 1, the second face 18 is preferably vertically disposed in an exemplary TV viewing screen application for being observed by an observer indicated schematically at 26. In a preferred embodiment, the scanning laser 20a includes three scanning lasers which respectively produce laser beams of red, blue, and green light, and which are conventionally varied in intensity and combined in a controlled manner for producing color images on the panel second face 18. Alternatively, a conventional white light laser that produces the three primary colors may be used to produce the varying color image.

As shown in FIG. 3, the light beam 22 enters an exemplary one of the waveguides 12 at its first end 12a with a suitable acceptance angle for being channeled internally within the waveguide 12 to thereby be transmitted to the second end 12b from which it is viewable. Referring again to FIG. 2, the individual waveguides 12 are configured and stacked together in accordance with the present invention to provide a relatively thin (as shown by depth D) yet tall (as shown by height H) panel 10.

More specifically, the panel second face 18 is disposed at an acute face angle A relative to the waveguides 12 or their longitudinal axes 14 for defining an intermediate section 10a of the panel 10 of maximum thickness T between the first and second faces 16, 18 which section extends perpendicularly to the axes 14 from a front one 12e of the waveguides 12 to an opposite back one 12f of the waveguides 12. Again, the terms "front" and "back" as used herein and in the claims are relative terms for indicating the general stacking direction of the waveguides 12.

The panel 10 has its maximum thickness T at the intermediate section 10a as measured from the front waveguide 12e to the back waveguide 12f, and tapers in decreasing thickness along the vertical height of the panel second face 18 from the front to back waveguides 12e, 12f. The panel 10 also tapers in decreasing length of the respective waveguides 12 as their lengths are measured between the intermediate section 10a and the waveguide second ends 12b from that measured length of the back waveguide 12f, i.e. length $l_b$, to the front waveguide 12e, i.e. length $l_f$.

The panel 10 is configured to be thin relative to the height H of the second face 18 in accordance with the present invention by being made to have a relatively small acute face angle A, with the panel maximum thickness T being less than the length $l_b$ of the back waveguide 12f from the second end 12b thereof to the intermediate section 10a, and less than the height H of the panel second face 18 as measured along the face 18 from the front waveguide 12e to the back waveguide 12f.

In the embodiment illustrated in FIG. 2, the intermediate section 10a is disposed perpendicularly to the longitudinal axes 14 and defines a spread angle S relative to the second face 18. The second face 18, the back waveguide 12f, and the intermediate section 10a define a right triangle in this exemplary embodiment, with the spread angle S being the complement of the acute face angle A, i.e., 90°—A. For a face angle A less than 45°, the maximum thickness T will be less than the length $l_b$ of the back waveguide 12f, as weft as being less than the height H of the second face 18, which is the hypotenuse of the right triangle. By selecting a face angle A which is almost zero in magnitude, the complement spread angle S is almost 90°, and the intermediate section 10a is positioned almost perpendicular to the panel second face 18 to provide a significantly thin panel 10 with a relatively large second face height H.

Once the panel second face 18 is suitably configured as described above, the panel first face 16 may take any suitable configuration while still having a thin panel 10. For example, and referring again to FIG. 2, the first and second faces 16, 18 in accordance with the exemplary TV application of the present invention being described are disposed substantially perpendicularly to each other, with the waveguides 12 extending obliquely between the first and second faces 16, 18. In this way, the light beam 22 may be directed vertically upwardly into the horizontal first or bottom face 16, and be viewed by the observer 26 generally perpendicularly to the vertical second or front face 18.

As illustrated in FIG. 2, each of the waveguides 12 between its ends 12a, 12b has a substantially uniform thickness t measured perpendicularly to its centerline axis 14, with all of the waveguides 12 having preferably equal thicknesses t and abutting each other for collectively defining a substantially uniform maximum thickness T of the entire untapered portion of the panel 10. As described above, the panel thickness decreases from the intermediate section 10a to its top end due to the acute face angle A. Each waveguide 12 may be conventionally manufactured from a suitable optical material such as transparent glass or plastic with the required refractive index in its core 12c and a suitable cladding 12d having a different refractive index for channeling light through the core 12c.

As shown in FIG. 3, adjacent cores 12c in sheet form are separated by a common sheet of cladding 12d, with the thickness t of each waveguide 12, therefore, including a respective one of the cladding sheets 12d. The waveguides 12 may be formed by interleaving sheets of the cladding 12d between sheets of the core 12c and suitably bonding together the sheets to form an integral assembly. For example, the core 12c and cladding 12d may be different plastics joined together by heat, acoustic energy, or other suitable means. Or, the core 12c may be glass, with the cladding 12d being a suitable adhesive.

Since the first and second faces 16 and 18 are oblique or perpendicular to each other, and the waveguides 12 extend obliquely between the first and second faces 16, 18 in this exemplary embodiment, the waveguides 12 necessarily vary in total longitudinal length L with the longest waveguide 12 being the back waveguide 12f on the backside of the panel 10, and the shortest waveguide 12 being the front waveguide 12e on the front side of the panel 10. And, since the second face 18 is disposed at the acute face angle A relative to the waveguides 12 or the longitudinal axes 14 thereof, each of the waveguide second ends 12b in the second face 18 is preferably beveled at the same acute face angle A to form a planar and continuous second face 18.

In the exemplary embodiment illustrated in FIG. 2, the panel second face 18 extends vertically, with each of the waveguide second ends 12b having a vertical bevel height V, with the vertical height H of the second face 18 being simply the sum of the individual vertical heights V. The height, or depth D of the first face 16 measured from the front to the back of the panel 10 is substantially or almost equal to the panel maximum thickness T in the illustrated embodiment. The first face depth D and the panel maximum thickness T are substantially smaller than the second face height H to provide the relatively thin yet tall panel 10 as described above.

More specifically, in a preferred and exemplary embodiment configured for standard US television having 525 lines of resolution, 525 of the waveguides 12 would be provided to provide 525 vertical waveguide second ends 12b forming the panel second face 18 or viewing screen. The height H of the second face 18 may be arbitrarily selected at about 1 meter, with the widths W of the waveguides 12 also being arbitrarily selected at 1.33 meters to effect a standard U.S. TV width-to-height ratio of 4:3. Of course other width-to-height ratios may be suitably selected and the vertical resolution may be increased or decreased as desired by simply changing the number and size of stacked waveguides 12.

In order to have a suitably thin panel 10, the face angle A may be selected as small as practical for effectively channeling the light beam 22 from the waveguide first ends 12a to the second ends 12b. For example, in order to have a panel maximum thickness T of about 2.54 cm, and a panel second face height H of 1 meter (100 cm), the required face angle A is merely the inverse sine of $2.54/100$ which is $1.46°$. The spread angle S is therefore 90° minus 1.46° or 88.54° which is almost 90°. The thickness t of each of the waveguides 12 is correspondingly 2.54 cm/525 which is about 48 microns of which the required cladding thickness is relatively small and on the order of about 1 or 2 microns.

In view of this substantially small bevel or face angle A and large spread angle S, an optical panel 10 having a tall viewing screen 18 may be made which is also significantly thin in its depth from front to back. Since the first face 16 is preferably perpendicular to the second face 18 in this exemplary embodiment, the thickness of the panel 10 as measured by the depth D of the first face 16 is simply the panel maximum thickness T divided by the cosine of the face angle A which is substantially equal to the panel thickness T itself. Note that the included angle B between the axes 14 of the waveguides 12 and the panel first face 16 is slightly less than 90° in this exemplary embodiment, or 90°−1.46°=88.54% and is equal to the spread angle S in the exemplary embodiment illustrated.

In the preferred embodiment illustrated in FIG. 2, the waveguide second ends 12b are preferably vertically continuous with each other from the front to back waveguides 12e, 12f to form a vertically continuous second face 18 therebetween, there being 523 waveguides stacked therebetween for a total of 525 waveguides 12. Since the waveguides 12 are preferably in ribbon or sheet form and stacked together like book pages, the resulting second face 18 includes substantially no dead space, the only dead space being due solely to the relatively small amount of cladding exposed thereat, thus a substantially 100% light emitting or viewing surface is provided. Such a surface provides an enhanced and higher brightness level of light as compared to conventional fiber optic cables having circular configurations which would have substantial dead space between abutting adjacent fibers.

Furthermore, the second face 18 is horizontally continuous without interruption along its width W since flat ribbon waveguides 12 are preferred and may be made as wide or as narrow as desired. The second face 18 is therefore continuous and flat both vertically and horizontally. However, in alternate embodiments it may be non-planar and interrupted if desired.

As shown in FIG. 2, the scanning laser 20a is conventionally effective for scanning the laser beam 22 both horizontally along the widths W of the waveguide first ends 12a to effect a horizontal scan $S_h$ in the first face 16 which is carried to the second face 18, and from waveguide-to-waveguide in the first face 16, from front to back, to effect a vertical scan $S_v$ carried to the second face 18, with each scan location defining a discrete picture element or pixel 28. The cross-sectional area of the laser beam 22 may be conventionally selected relative to the thickness t of the waveguides 12 to transmit a circular pixel, for example, into the first end 12a. The pixel 28 will be elongated at the waveguide second end 12b by the reciprocal of the inverse sine of the face angle A which is about forty-times, for example in the preferred embodiment described above.

The vertical resolution of the second face 18 is merely the number of corresponding pixels 28a produced therein which is equal to the number of waveguides 12, for example 525. The horizontal resolution, however, is selectively variable as desired by simply controlling the number and size of the horizontal pixels 28 produced by the scanning laser 20a. Accordingly, the number of pixels 28 both vertically and horizontally may be selected as desired for controlling the resolution as well as the size of the image 24 produced on the panel second face 18. And since substantially 100% of the surface area of the panel second face 18 is the light carrying core material 12c, substantial brightness is obtained therefrom without significant dead space.

As shown in FIG. 2, the panel 10 is configured for positioning the second face 18 vertically for the observer 26 to view the image 24 thereon by merely horizontally facing the second face 18. In this way, the observer 26 cannot look directly into the laser beams 22 channeled longitudinally through the waveguides 12. As shown in FIG. 3, the waveguide second ends 12b are preferably conventionally optically frosted for diffusing light therefrom for forming the pixels 28a thereon. As shown in FIG. 1, the scanning laser 20a of the light providing means 20 is effective for transmitting a television or video image 24 vertically upwardly into the horizontal first face 16 for viewing from the vertical second face 18 which is disposed perpendicularly to the first face 16. A substantially large laser scanning projection TV is thereby created. And, most significantly, the depth or maximum thickness T of the optical panel 10 is significantly small for providing a relatively thin or flat panel screen for viewing.

Figure 4:
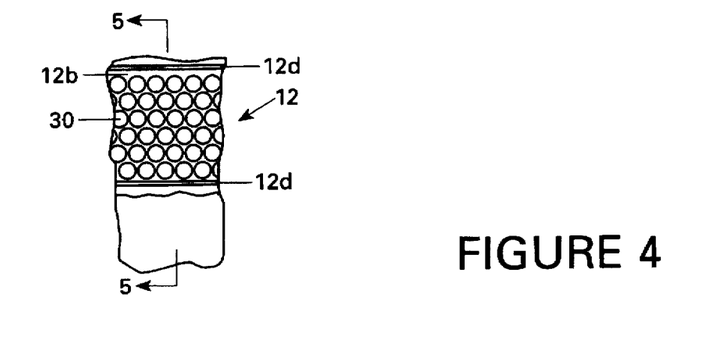
FIG. 4 is an end view of a portion of a second end of one of the waveguides illustrated in FIG. 2 in an alternate embodiment including a plurality of concave indentations therein.
Figure 5:
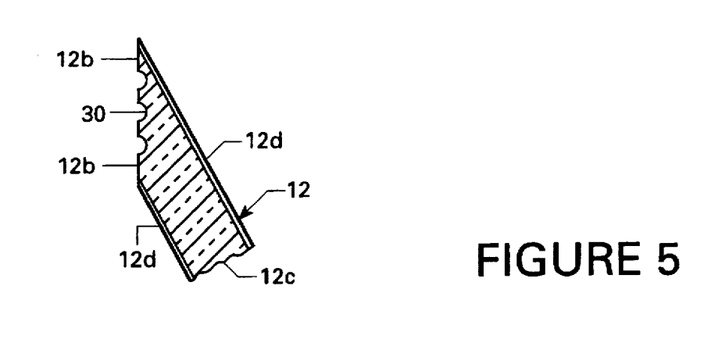
FIG. 5 is an elevational sectional view through the end of the waveguide illustrated in FIG. 4 and taken along line 5—5.

The waveguide second ends 12b may take other forms for suitably diffusing light to produce the resulting image 24 such as shown for example in FIGS. 4 and 5. In this alternate embodiment, each of the waveguide second ends 12b includes a plurality of vertically and horizontally spaced apart concave indentations or negative lenses 30 for diffusing the light emitted therefrom for viewing by the observer 26 (see FIG. 1) perpendicularly to the waveguide second end 12b.

In the embodiment of the invention illustrated in FIGS. 1–5, each of the waveguides 12 is preferably planar or flat from its first end 12a to its second end 12b without bending or twisting thereof. Furthermore, the second face 18 as shown in FIGS. 1 and 2 is also preferably planar or flat for providing a generally flat viewing screen. Similarly, the first face 16 is also preferably planar or flat.

Figure 6:
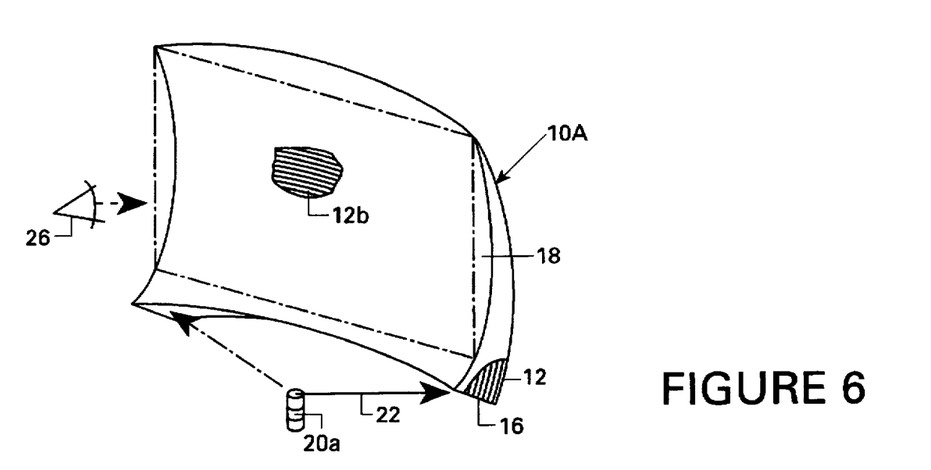
FIG. 6 is a schematic view of an optical panel in accordance with another embodiment of the present invention wherein the waveguides are arcuate.

In alternate embodiments, the first and second faces 16 and 18 need not be planar but may be varied in shape as desired. For example, FIG. 6 illustrates the optical panel in accordance with an alternate embodiment designated 10A which is not a planar or flat screen but is nevertheless thin in its depth relative to the height and width of the screens. In this embodiment, each of the waveguides 12 is arcuate, for example vertically arcuate along the longitudinal axes 14 (see FIG. 1), and the second face 18 is correspondingly vertically concave. The waveguides 12 may also be horizontally arcuate along the waveguide width W (see FIG. 1) and the second face 18 may be also correspondingly horizontally concave. By combining both vertically and horizontally arcuate waveguides 12 to form a both horizontally and vertically concave second face 18, the second face 18 may be a portion of a spherical surface to provide a wraparound viewing effect of the screen for the observer 26 positioned at a suitable viewing point thereof.

Furthermore, the first face 16 may be horizontally concave along the waveguide width W and face downwardly toward the laser 20a so that the scanning laser 20a may transmit the laser beam 22 thereto with less of an incidence angle relative thereto.

The optical panel 10 described above effectively provides a relatively large viewing area with a significantly thin screen and provides high resolution and brightness. As described above, the vertical resolution may be changed by varying the number of stacked waveguides 12 which, for a high definition TV (HDTV) system would use 1,100 waveguides 12 for obtaining 1,100 lines of resolution. The horizontal resolution is simply controlled by varying the number of pixels 28 by changing the laser spot size produced along the width of each waveguide 12. The laser light beam 22 enters the stacked waveguides 12 at the bottom, first face 16 after being reflected from a scanning mirror of the laser 20a which rasters the beam 22 horizontally across each waveguide 12 for the horizontal scan $S_h$ as well as for the vertical scan $S_v$. The light beam 22 travels upwardly through each of the waveguides 12 and exits the respective second ends 12b which form the viewing screen, or second face 18.

The light providing means 20 may take any conventional form and may use conventional mechanical scanning mirrors for scanning the light into the panel first face 16, or may use other suitable acousto-optic or electro-optic devices as desired.

Since the panel 10 functions to channel or guide light or similar energy, its two faces 16, 18 may have any suitable coatings or devices cooperating therewith to enhance transmission or dispersion characteristics of the channeled beam as desired. The beam may enter the first face 16 and exit the second face 18 as described above, or vice versa, depending upon the desired application of the panel 10.

Figure 7:
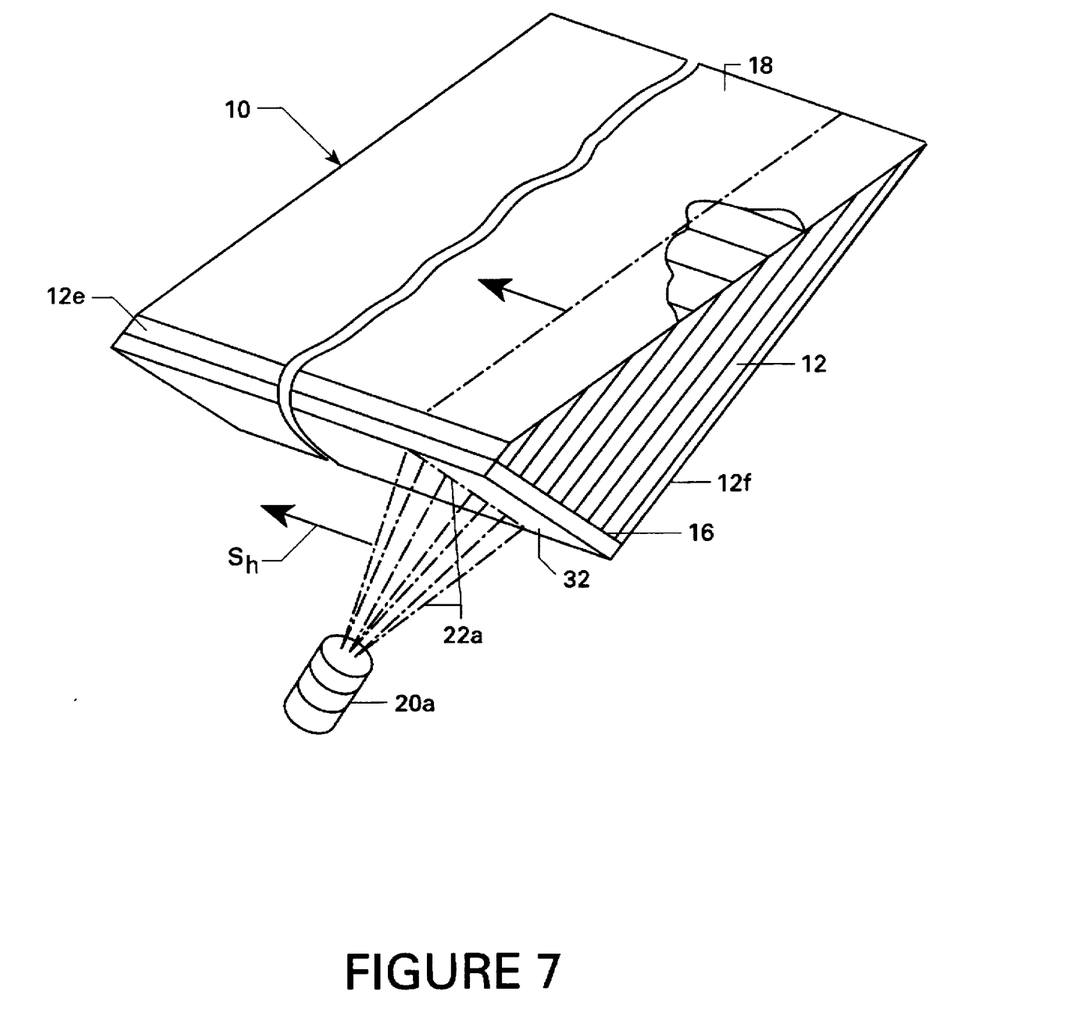
FIG. 7 is a schematic view of an optical panel in a large screen projection TV in accordance with another embodiment of the invention having a light modulator at an input face thereof.

For example, FIG. 7 illustrates schematically the panel 10 in accordance with an alternate embodiment of the invention also in the form of a projection TV like that shown in FIG. 1. However, in this embodiment, conventional means in the form of a light modulator 32 adjoins the panel first face 16 for modulating the intensity of the input light from the laser 20a.

The laser 20a conventionally produces a line or strip of light 22a into the modulator 32 simultaneously across or over all 525 waveguides 12 from the front waveguide 12e to the back waveguide 12f. Whereas the circular laser beam 22 in the FIG. 1 embodiment must raster each of the 525 waveguides 12 individually, the strip laser beam 22a in FIG. 7 simultaneously scans all 525 waveguides 12 together. This will provide a higher refresh rate on the screen, or panel second face 18, and reduce or eliminate flicker.

The light modulator 32 modulates each laser beam strip 22a from waveguide-to-waveguide 12 to vary the intensity of the light at each of the 525 waveguides to provide a simultaneous scan line to form a vertical line of the image on the second face 18. The laser beam strip 22a is then scanned horizontally along the width of the waveguides, i.e. $S_h$, to produce the resulting two-dimensional images on the second face 18.

The light modulator 32 may take any suitable form which is effective to modulate light at each of the plurality of waveguides 12 in the two perpendicular directions along the width of the waveguides 12 and from the front to back waveguides 12e, 12f to produce a two-dimensional checkerboard-type grid. The vertical resolution of the second face 18 is again limited by the number of waveguides 12 stacked together, with the horizontal resolution being selectively variable by both thickness of the laser beam strip 22a and resolution capability of the light modulator 32.

For example, the light modulator 32 may be in the form of a conventional thin film semiconductor suitably bonded to or adjoining the panel first face 16 for modulating the input light into the waveguides 12. Conventional Active Matrix Liquid Crystal Displays (AMLCD), or Spatial Light Modulators (SLM) being developed, or other suitable devices may be used to provide the required light modulation.

As indicated above, the optical panel 10 provides a thin screen display with high resolution and brightness. Image contrast is another important parameter in determining image quality. In the exemplary embodiment described above, the waveguide cores 12c and cladding sheets 12d are transparent, and with the second face or screen 18 being frosted, the screen 18 is thereby translucent. In a bright ambient light environment, the screen 18 would appear light, with the image 24 appearing on the screen 18 with moderate contrast.

Figure 8:
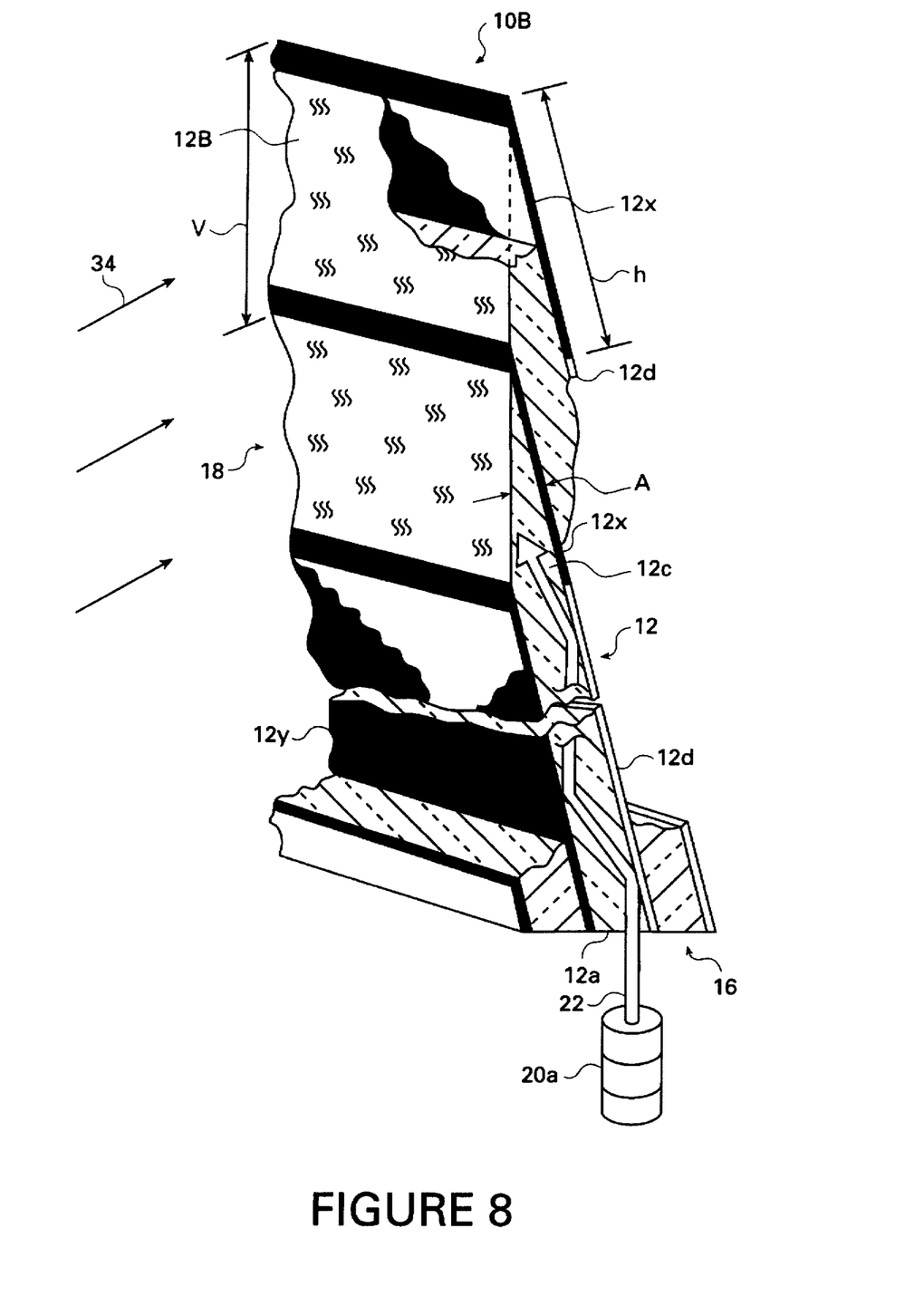
FIG. 8 is an enlarged, partly sectional elevational view of adjacent ones of the waveguides illustrated in FIG. 2 in accordance with another embodiment of the present invention for effecting a visually black video display screen.

In order to substantially improve the contrast of the projected image 24 on the screen 18, the optical panel or display as shown in FIGS. 1–7 may be suitably modified in accordance with another feature of the present invention as illustrated schematically in FIG. 8 in a modified optical display designated 10B which may be identical to any of the embodiments illustrated in FIGS. 1–7 except for the following improvements.

Like the embodiments disclosed above, the optical display 10B includes a suitable plurality of stacked together optical waveguides 12 having first and second opposite ends 12a,b collectively defining an image input face 16 and an image screen 18, respectively, with the screen 18 being substantially oblique or perpendicular to the input face 16 for providing the thin screen described above. Each of the waveguides 12 includes the transparent core 12c bound by a cladding layer 12d having a lower index of refraction relative thereto for effecting total internal reflection of the image light beam 22 transmitted into the input face 16 to project the image 24 on the screen 18.

In accordance with an additional feature of the present invention, each of the cladding layers 12d may include a cladding cap 12x integrally joined thereto at the waveguide second ends 12b. Each of the cores 12c is beveled at the acute face angle A at the second end 12b as indicated above so that the cladding cap 12x is viewable obliquely or generally perpendicular through the transparent core 12c defining the screen 18. Each of the cladding caps 12x is non-transparent and is preferably black for absorbing external ambient light 34 incident upon the screen 18 for improving contrast of the image 24 projected internally on the screen 18. And, the beveled cores 12c are also preferably frosted as described above for diffusing the image light emitted therefrom.

In the black optical display 10B illustrated in FIG. 8, each of the waveguide second ends 12b has a vertical height V, also designated its bevel height. And, the cladding cap 12x has a cap height h which is preferably at least as large as the bevel height V for providing overlapping black cladding caps 12x continuously vertically across the screen 18. Since the waveguides 12 are preferably continuous ribbons having the full width W illustrated in FIG. 1, the cladding caps 12x also extend the full width of the screen 28, and therefore, the entire screen 18 is actually black when viewed from the front by the observer 26 without the image 24 being projected thereon.

When the image 24 is projected on the screen 18, the black portions thereof will be actually black since the black cladding cap 12x is viewable through the transparent cores 12c at the beveled waveguide second ends 12b. As indicated above in the Background section, it is impossible for direct view cathode ray tubes to be actually black since they operate using phosphors which are not black. The thin panel display 10B, in contrast, provides an actually black screen 18 which allows black portions of the video image to appear absolutely black. Accordingly, the image contrast from this display screen is higher than any other type of display screen currently available.

Since the black cladding caps 12x are provided solely for absorbing the ambient external light 34 incident upon the screen 18, they are only required at the upper edges of the waveguides 12 which define the viewing screen 18. As indicated above, the cladding caps 12x have corresponding cap heights h which need only be sufficiently long for providing vertical overlap between each succeeding cladding cap 12x from waveguide-to-waveguide so that the observer 26 sees a continuously black screen 18 both vertically and horizontally.

Since the waveguides 12 are stacked front-to-back, and the top ends 12b thereof are beveled to define the viewing screen 18, and, since the cladding caps 12x are non-transparent and black, all the internal cladding layers 12d are not visible from outside the display 10B. Accordingly, the cladding layers 12d themselves need not be black since they are not externally viewable from the screen 18, and may be any suitable optical material for maximizing the total internal reflection of the image light 22 through the cores 12c. It is preferable to only reflect the image light 22 inside each of the waveguides 12 without absorption therein for maintaining high intensity of the image projected internally on the screen 18.

Accordingly, it is preferred that the non-transparent cladding caps 12x are disposed solely at the upper edges of each of the waveguides 12 adjacent to the waveguides second ends 12b, with the transparent cladding layers 12d extending from respective ones of the cladding caps 12x to the input face 16. This is shown for several of the waveguides 12 illustrated in FIG. 8 by the distinct joints therebetween.

As indicated above, the light providing means 20 provides the image light 22 into the input face 16 for projecting the image 24 against the screen 18. In the preferred embodiment, the light providing means 20 is in the form of the laser 20a which inherently provides collimated image light 22 into the input face 16 within an acceptance angle for internally reflecting substantially all the incident image light through the cores 12c to the screen 18. For other light sources such as cathode ray tubes (CRT), liquid crystal displays (LCD), or digital micro mirrors (DMM), suitable light collimators may be used for ensuring projection of the image light 22 into the input face 16 within a suitable acceptance angle for obtaining total internal reflection of all the incident light.

The cladding layers 12d and cladding caps 12x are functionally different, since the cladding layers 12d are provided for maximizing internal reflection within the waveguides 12 without appreciable absorption of the internal light, whereas the cladding caps 12x maximize absorption of the ambient external light 34, with light reflection being undesirable. The cladding layers 12d and adjoining cladding caps 12x may be formed of suitable optical materials, such as glass, polymer, or transparent epoxy for the former with a suitable index of refraction lower than that of the cores 12c, and with the latter being formed of a suitable epoxy with black particles suspended therein such as lampblack carbon.

In an alternate embodiment, which is also shown in a portion of FIG. 8, the cladding caps may be formed integrally with the cladding layers in a common layer designated 12y, and extend from the input face 16 to the screen 18. FIG. 8 illustrates both embodiments of the discrete cladding cap 12x and integral layer 12y for simplicity of presentation. The display 10B would ordinarily use either one or the other embodiment, although the use of both is possible, if desired.

The common cladding layer 12y is both black for absorbing the ambient light 34 incident at the screen 18, and also has a lower index of refraction than that of the cores 12c for internally reflecting the image light 22 through the cores 12c. Since the image light 22 is collimated and is projected into the individual cores 12c at relatively shallow incident angles, total internal reflection may be obtained without absorption of the internal image light 22. In contrast, the external ambient light 34 is incident on the screen 18 and the upper portion of the common cladding layer 12y obliquely or substantially perpendicular relative thereto. The black cladding layer 12y may therefore effectively absorb the external ambient light 34 without appreciable reflection for still providing a suitably black viewing screen 18.

In an exemplary embodiment for either the discrete cladding cap 12x itself, or the cladding cap with the integral cladding layer 12y, a low refractive index and low viscosity epoxy, such as Epoxy Technology Model VA-6, may be mixed with a lampblack carbon, available from Fisher Scientific, with the carbon being suspended in the epoxy in a ⅔ ratio by weight. In one embodiment, this epoxy and lampblack mixture was placed between glass sheet cores 12c and allowed to cure at room temperature for about 24 hours. The resulting waveguides were effective for suitably channeling internal light by total internal reflection, while at the same time absorbing external ambient light at the bevel face of the waveguide assembly. And, the resulting viewing screen appeared flat black. Of course, other suitable black cladding compositions may be used as desired.

The black optical display 10B disclosed above therefore enjoys high image contrast with actual black portions of the image, while also enjoying the relatively high resolution and brightness described above with respect to the initial embodiments of the optical panel. And, since the screen 18 may be configured almost parallel to the waveguides 12 and substantially perpendicular to the input face 16, the resulting optical display is extremely thin.

Of course, since the thin optical panels described above are uniquely efficient devices for channeling light, they may have other uses besides large screen projection TV. They may be used wherever a relatively thin, lightweight, high resolution, brightness, and contrast light channeling device is required wherein the thin panel provides advantage.

Although the waveguides 12 are preferably in ribbon form, conventional cylindrical optical fibers could also be configured in accordance with the present invention with at least one end being sharply bevelled to define an acute angle with the longitudinal axes of the fibers. However, this would then predetermine the horizontal resolution as well as the vertical resolution, and provide dead space between the fibers which would decrease screen brightness.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. An optical display 10B comprising:

a plurality of stacked together optical waveguides 12 having first and second opposite ends 12a,b defining an image input face 16 and an image screen 18, respectively, with said screen 18 being oblique to said input face 16;

each of said waveguides 12 including a transparent core 12c bound by a cladding layer 12d having a lower index of refraction for effecting internal reflection of image light 22 transmitted into said input face 16 to project an image 24 on said screen 18, with each of said cladding layers 12d including a cladding cap 12x integrally joined thereto at said waveguide second ends 12b;

each of said cores 12c being beveled at said waveguide second end 12b so that said cladding cap 12x is viewable through said transparent core 12c; and each of said cladding caps 12x being black for absorbing external ambient light 34 incident upon said screen 18 for improving contrast of said image 24 projected internally on said screen 18.

2. A display according to claim 1 wherein each of said waveguide second ends 12b has a bevel height, and said cladding cap 12x has a cap height at least as large as said bevel height for providing overlapping black cladding caps 12x continuously across said screen 18.

3. A display according to claim 2 wherein said cladding caps 12x are disposed solely adjacent to said waveguide second ends 12b, with said cladding layers 12d extending from respective ones of said caps 12x to said input face 16.

4. A display according to claim 2 wherein said cladding caps are integral with said cladding layers 12y and extend from said input face 16 to said screen 18, and are both black for absorbing ambient light at said screen 18, and have a lower index of refraction than said cores 12c for internally reflecting said image light therethrough.

5. A display according to claim 2 wherein said waveguides 12 are in the form of ribbons each having generally rectangular cross-sections from said input face 16 to said screen 18.

6. A display according to claim 5 wherein said screen 18 is almost parallel to said waveguides 12.

7. A display according to claim 2 wherein said cladding caps 12x comprise lampblack carbon suspended in epoxy.

8. A display according to claim 2 in combination with light providing means 20 for providing image light into said input face 16 within an acceptance angle for internally reflecting substantially all incident image light through said cores 12c to said screen 18.

9. A display combination according to claim 8 wherein said light providing means 20 is in the form of a scanning laser 20a effective for emitting a laser beam 22 into said input face 16, said beam 22 being scannable both horizontally along said waveguide first ends 12a to effect a horizontal scan in said screen 18, and from waveguide-to-waveguide in said input face 16 to effect a vertical scan in said screen 18, with each scan location defining a discrete pixel 28.

10. A display combination according to claim 9 wherein the number of said pixels 28 in said vertical scan is equal to the number of said waveguides 12, and the number of said pixels 28 in said horizontal scan is selectively variable by said light providing means 20.

11. A display combination according to claim 8 wherein each of said waveguides 12 is planar.

12. A display combination according to claim 8 wherein said beveled cores 12c are frosted at said screen 18 for diffusing said image light emitted therefrom.

13. A black optical display comprising:

a plurality of light channeling optical waveguides 12 each having a first end 12a for passing light, an opposite, second end 12b for passing light, and a longitudinal axis 14 extending between said first and second ends 12a, 12b, said waveguides 12 being stacked laterally together from said first to second ends 12a, 12b, with said longitudinal axes 14 being generally parallel to each other;

said first ends 12a of all said waveguides 12 being disposed generally coplanar and collectively defining a panel first face 16;

said second ends 12b of all said waveguides 12 being disposed generally coplanar and collectively defining a panel second face 18;

said panel second face 18 being disposed at an acute face angle relative to said longitudinal axes 14 of said waveguides 12 thereby to define an intermediate section 10a of said panel extending from a front one 12e of said waveguides 12 to an opposite back one 12f of said waveguides 12;

said panel having a maximum thickness at said intermediate section 10a and tapering in thickness along said panel second face 18 from said front waveguide 12e to said back waveguide 12f, and tapering in length between said intermediate section 10a and said waveguide second ends 12b from said back waveguide 12f to said front waveguide 12e;

said panel maximum thickness being less than said length of said back waveguide 12f from said second end 12b thereof to said intermediate section 10a, and being less than the height of said panel second face 18 from said front waveguide 12e to said back waveguide 12f;

each of said waveguides 12 including a transparent core 12c bound by a cladding layer 12d having a lower index of refraction for effecting internal reflection of image light 22 transmitted into said input face 16 to project an image 24 on said screen 18, with each of said cladding layers 12d including a cladding cap 12x integrally joined thereto at said waveguide second ends 12b; and each of said cladding caps 12x being black for absorbing external ambient light 34 incident upon said screen 18 for improving contrast of said image 24 projected internally on said screen 18.

* * * * *